(12) United States Patent
Akutagawa

(10) Patent No.: US 6,925,206 B2
(45) Date of Patent: Aug. 2, 2005

(54) WHITE LINE DETECTION APPARATUS AND WHITE LINE DETECTION METHOD

(75) Inventor: Kiyoshi Akutagawa, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 449 days.

(21) Appl. No.: 10/208,836

(22) Filed: Aug. 1, 2002

(65) Prior Publication Data

US 2003/0026456 A1 Feb. 6, 2003

(30) Foreign Application Priority Data

Aug. 6, 2001 (JP) .......................................... 2001-237667

(51) Int. Cl.$^7$ ................................................. G06K 9/34
(52) U.S. Cl. ........................ 382/173; 382/190; 382/274
(58) Field of Search ................................. 382/104, 173, 382/168, 190, 254, 264, 274

(56) References Cited

U.S. PATENT DOCUMENTS 5,751,846 A  5/1998  Higgins-Luthman et al.
5,835,614 A * 11/1998  Aoyama et al. ............ 382/274
6,763,125 B2 * 7/2004  Ohta ........................... 382/274

FOREIGN PATENT DOCUMENTS

| EP | 0188 193 A2 | 7/1986 |
| EP | 0 827 127 A1 | 3/1998 |
| JP | 2000-335340 A | 12/2000 |

* cited by examiner

Primary Examiner—Phuoc Tran
(74) Attorney, Agent, or Firm—McDermott Will & Emery LLP

(57) ABSTRACT

A white line detection apparatus comprises an extraction device that extracts an image of a white line detection processing area set within a road image captured by an image-capturing device, a maximum value estimating device that estimates a maximum value among pixel values constituting an image of road surface areas other than the white line based upon the pixel values representing the image extracted by the extraction device, a contrast reducing device that reduces the contrast of an image corresponding to pixel values equal to or lower than the maximum value among the pixel values constituting the image of road surface areas other than the white line which has been estimated and a detection device that detects the white line based upon the image whose contrast has been lowered by the contrast reducing device.

8 Claims, 5 Drawing Sheets

YAW ANGLE θ

PITCH ANGLE α

WHITE LINE DETECTION APPARATUS AND WHITE LINE DETECTION METHOD

BACKGROUND OF THE INVENTION

1. Field of the Invention

The present invention relates to an apparatus and a method adopted to identify the contour of a road by detecting a white line present on the road.

2. Description of the Related Art

There are apparatuses in the known art that obtain an image of a road with a camera mounted on a vehicle and detects a white line by processing the obtained image. The accuracy of the white line detection may become poor or the white line detection itself may become disabled in such an apparatus if the white line contrast is lowered as the white line becomes faded or due to a reflection of sunlight off the road surface. Accordingly, it is necessary to implement image processing in order to enable detection of the white line when its contrast is low.

Japanese Laid-Open Patent Publication No. 2000-335340 discloses a method for raising the contrast of an image captured by an on-vehicle camera. In this method, a density variation histogram is prepared from the captured image and density conversion is implemented so as to modify the densities within the range between the highest and the lowest density levels obtained in a uniform manner by excluding certain density levels at the two extreme ends in the histogram at a predetermined density level. In addition, the publication also proposes a method of image density conversion which is achieved by emphasizing a dark area or a light area based upon the relationship between the density level at the barycenter of the histogram and the central value of the density levels. The accuracy of object detection is improved by achieving better contrast in the captured image through either of these methods.

SUMMARY OF THE INVENTION

However, while the contrast of a white line is improved through a uniform density conversion by adopting the density conversion method in the related art described above in the detection of the white line, the uniform density conversion also results in the contrast of road surface areas other than the white line becoming emphasized. Thus, the S/N ratio of the white line is not improved and the white line cannot be detected with a high degree of reliability. In addition, the image density conversion whereby a light area of the image is emphasized in the related art emphasizes any area that is lighter than the white line on the road surface, and an erroneous detection of a white line may occur as a result. There is another problem in that since the varying degrees of density in the image of the road surface are emphasized through the density conversion in the related art, an erroneous detection of a nonexistent white line can readily occur.

An object of the present invention is to provide a white line detection apparatus and a white line detection method that achieve reliable detection of a white line by lowering the contrast in the image of the road surface over the area other than the white line.

The white line detection apparatus according to the present invention comprises an extraction device that extracts an image of a white line detection processing area set within a road image captured by an image-capturing device, a maximum value estimating device that estimates a maximum value among pixel values constituting the image of the road surface over the area other than a white line based upon the pixel values representing the image extracted by the extraction device, a reducing device that reduces the contrast of an image corresponding to pixel values equal to or lower than the maximum value among the pixel values constituting the image of the road surface over the area other than the white line which has been estimated by the maximum value estimating device and a detection device that detects the white line based upon the image whose contrast has been lowered by the reducing device.

In the white line detection method according to the present invention, an image of a white line detection processing area set within a road image captured by an image-capturing device is extracted, a maximum value among pixel values constituting an image of a road surface over the area other than a white line is estimated based upon pixel values corresponding to the extracted image, the contrast of an image represented by pixel values equal to or lower than the maximum value among the pixel values constituting the image of the road surface over the area other than the white line which has been estimated is reduced and the white line is detected based upon the image whose contrast has been reduced.

DETAILED DESCRIPTION OF THE PREFERRED EMBODIMENT

Figure 1:
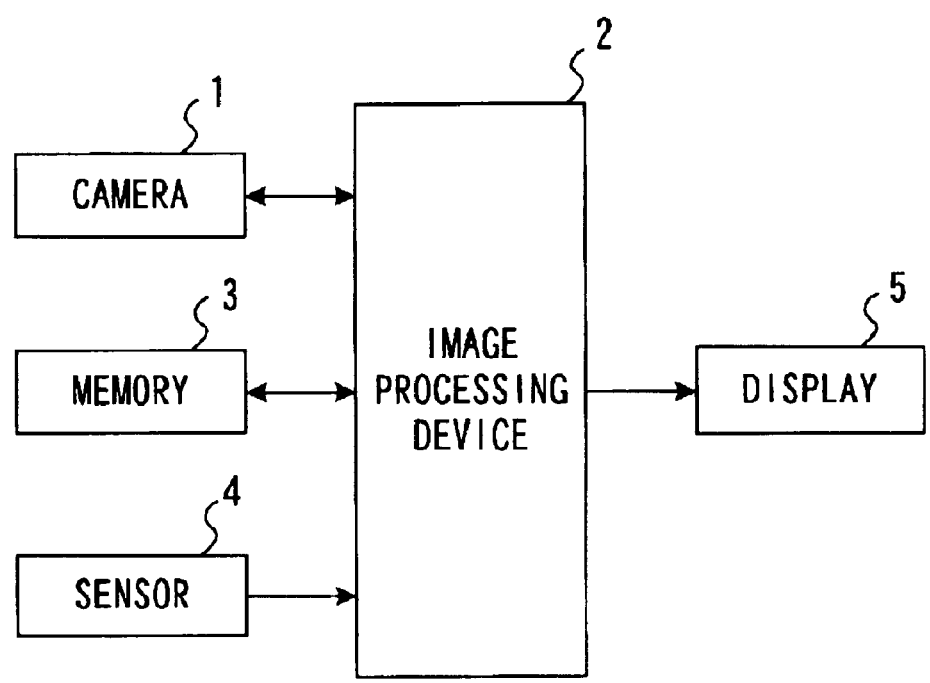
FIG. 1 shows the structure adopted in an embodiment of the white line detection apparatus according to the present invention.
Figure 2:
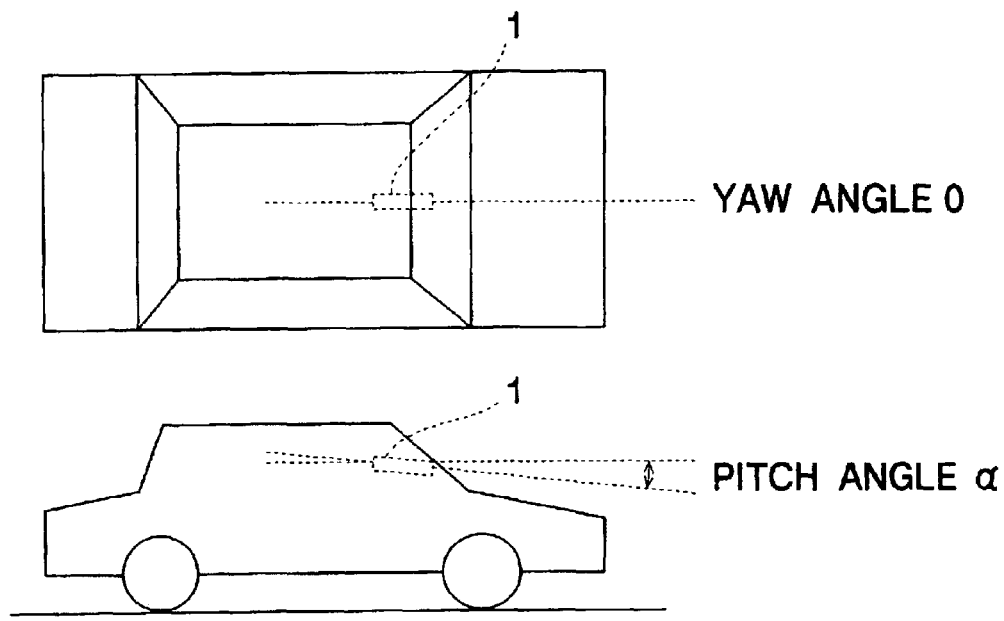
FIG. 2 illustrates the position at which the camera should be mounted on a vehicle.

FIG. 1 shows the structure adopted in an embodiment of the white line detection apparatus according to the present invention. The white line detection apparatus in the embodiment comprises a camera 1, an image processing device 2, a memory 3, a sensor 4 and a display 5. The camera 1, which is mounted at the center along the vehicle width at the top of the front window in the cabin as shown in FIG. 2, captures an image of the road extending ahead of the vehicle. The camera 1 is installed by ensuring that the yaw angle formed by the optical axis of the lens of the camera 1 and the vehicle center line is set to 0 and that the pitch angle is set to a predetermined angle α. The captured image is cyclically provided to the image processing device 2. The image processing device 2 detects a white line on the road by processing the image captured by the camera 1. Various types of data including the pixel area size to be detailed later are stored in the memory 3. The sensor 4 detects the vehicle behavior including the vehicle speed, the pitch angle, the yaw angle and the like. The display 5 is a display device on which the road state such as the presence of the white line having been detected and the like is displayed.

Figure 3:
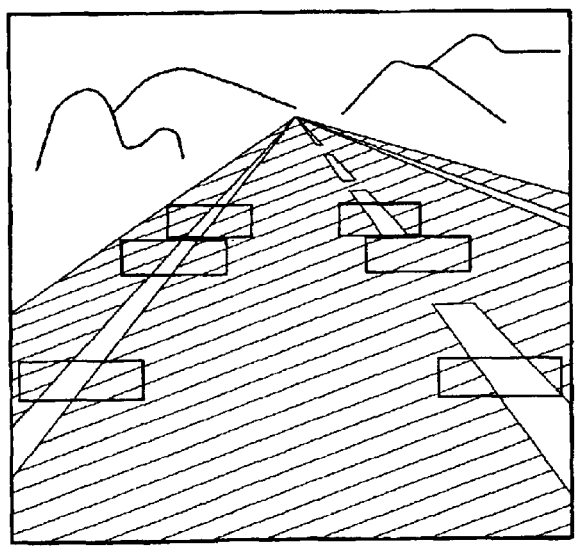
FIG. 3 shows an image captured by the camera and the white line detection area.

The image processing device 2 estimates the position of the white line in the image transmitted from the camera 1 based upon the geometrical conditions of the white line and updates a road model to be detailed later by ascertaining the degree of displacement of the current white line position relative to the white line position in the road model. As a result, it becomes possible to estimate the white line position in a stable manner on a continuous basis. FIG. 3 shows an image of a road captured by the camera 1. White lines are drawn at the two sides of the 2-lane road, with a broken line drawn down the center. The rectangular enclosed area is the white line detection area, which is set based upon the results of the previous white line detection. The image processing device 2 detects the white line by implementing the processing which is to be detailed later on the image of the white line detection area.

Figure 4:
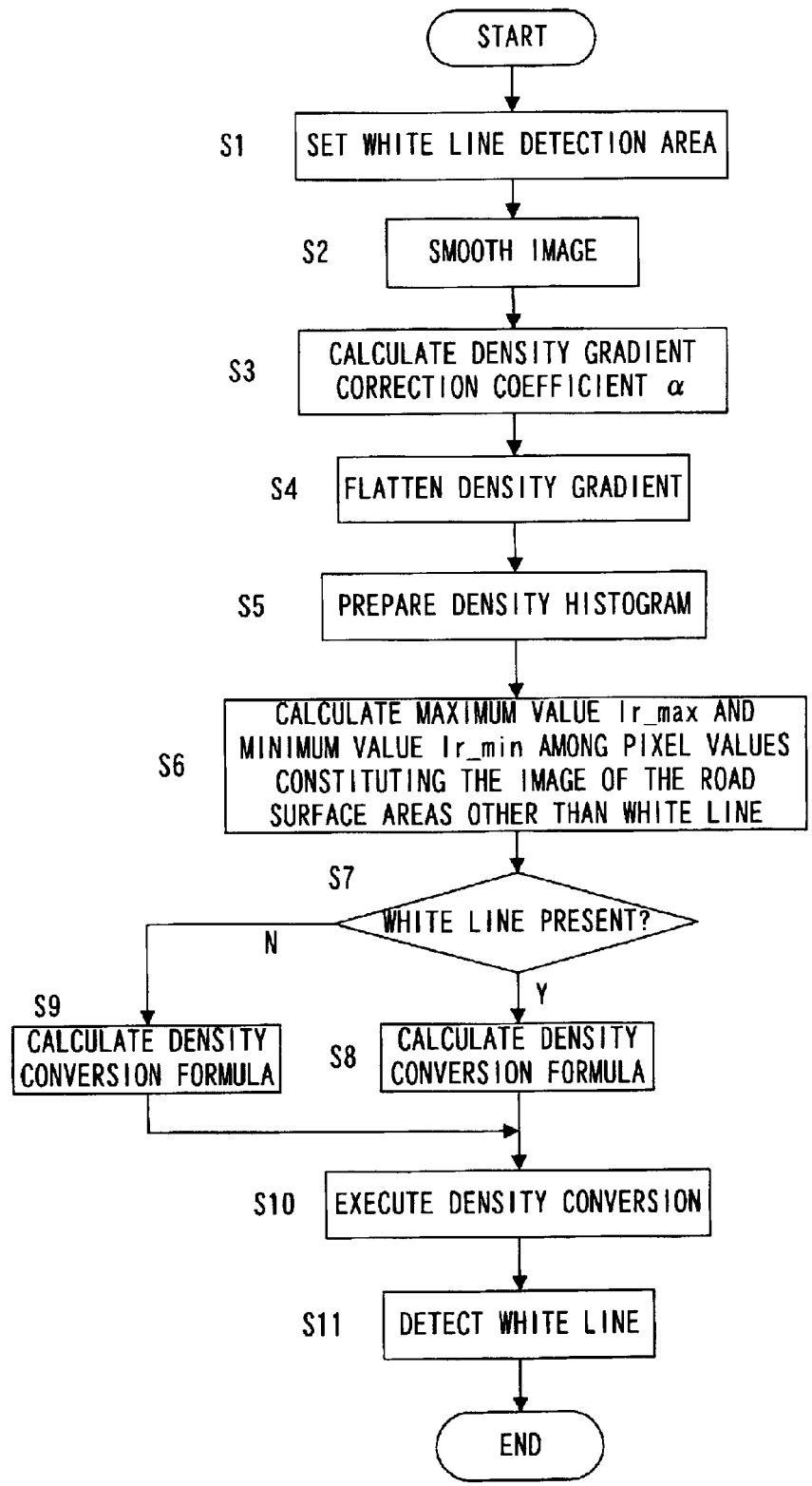
FIG. 4 presents a flowchart of the processing procedure executed by the white line detection apparatus according to the present invention in order to detect a white line.

FIG. 4 presents a flowchart of the procedure for white line detection processing executed by the image processing device in the white line detection apparatus according to the present invention. The processing in step S1 and subsequent steps is started up as an image captured by the camera 1 is transmitted to the image processing device 2. In step S1, the area over which the white line detection is to be performed is set as mentioned earlier and the operation proceeds to step S2. The processing in step S2 and subsequent steps is implemented over the white line detection area set in step S1. Through the processing executed in steps S2~S4, the density gradient of low spatial frequencies which are present over, for instance, the entire processing area in the original image is corrected and flattened. The term "spatial frequency" is used to refer to a frequency that reflects a spatial (locale-related) distribution of the image brightness or the color difference.

In step S2, the image is smoothed in order to calculate a density gradient correction coefficient α which is to be detailed later. Any of various methods may be adopted to smooth the image. In the embodiment, the image is smoothed through the moving average method achieved by ascertaining the moving average of pixel values over an area of a predetermined size. In the moving average method, the average of the values indicated by the pixels surrounding a target pixel and the value of the target pixel is used to replace the value at the target pixel. It is necessary to set the pixel area ranging over the predetermined size to a width corresponding to the width of a pixel area ranging over the white line, e.g., approximately 5 times the width of the pixel area matching the white line width. Since the size of the pixel area ranging over the white line width is determined through approximation in correspondence to the position of the white line detection area on the image based upon the manner with which the camera is mounted on the vehicle and the image-capturing direction, it should be ascertained and stored in the memory 3 in advance in correspondence to each image processing area. The image must be smoothed over an area that is larger than the pixel area required for the actual white line detection, since a smoothing operation requires a pixel area surrounding the actual white line area. Accordingly, the processing area size over which the original image is processed by the image processing device 2 should be set to a size which is larger by the size of the pixel area surrounding the white line area.

Figure 5:
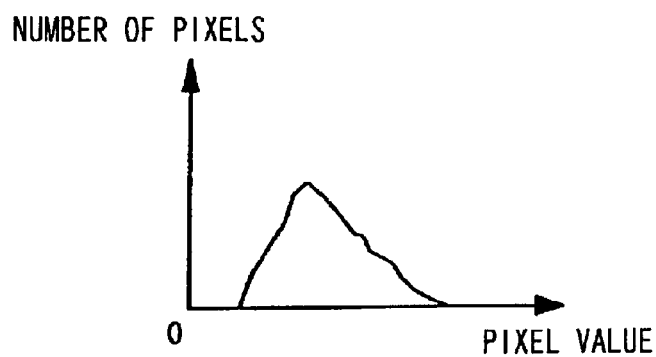
FIG. 5 presents a density histogram prepared based upon an original image.
Figure 6:
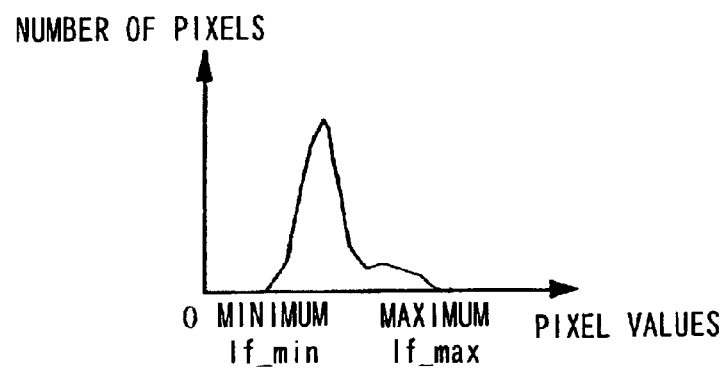
FIG. 6 is a density histogram obtained by flattening the density gradient of the original image.

Once the image is smoothed, the operation proceeds to step S3. In step S3, the density gradient correction coefficient α to be used to flatten the density in correspondence to a density value (pixel value) at each pixel constituting the original image is calculated through the formula in expression (1).

$$\alpha(x, y) = Is\_avg / Is(x, y) \quad (1)$$

with α(x, y): coefficient for flattening the density at coordinates (x, y)
Is_avg: the average of pixel values within the processing area in the smoothed image
Is(x, y): the pixel value at coordinates (x, y) in the smoothed image After the density gradient correction coefficient α is calculated, the operation proceeds to step S4. In step S4, the density gradient of the image is flattened. The pixel value If at a given pixel in the image with its density gradient flattened can be calculated through the formula in expression (2) by using the density gradient correction coefficient α calculated in step S3.

$$If(x, y) = \alpha(x, y) \times I(x, y) \quad (2)$$

with If(x, y): the pixel value at coordinates (x, y) in the image with the flattened density gradient
I(x, y): the pixel value at coordinates (x, y) in the original image Once the density gradient is flattened, the operation proceeds to step S5. In step S5, a density histogram of the image with the flattened density gradient is prepared. FIG. 5 shows the density histogram prepared by using the original image before undergoing the image processing. The horizontal axis represents the pixel value, whereas the vertical axis represents the number of pixels (frequency). FIG. 6 shows the density histogram obtained after flattening the density gradient of the original image. In the figure, the maximum pixel value is indicated as If_max and the minimum pixel value is indicated as If_min. By flattening the density gradient, the pixel value corresponding to the largest number of pixels in the density histogram in FIG. 6 can be regarded as the median of the density in the image of road surface areas other than the white line. When the density histogram is prepared, the operation proceeds to step S6.

Figure 7:
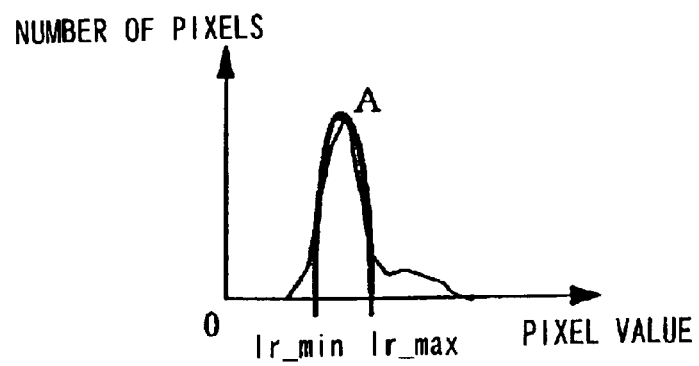
FIG. 7 illustrates a method of calculating the maximum value and the minimum value among the values indicated by the pixels constituting the image of road surface areas other than the white line.

In step S6, the maximum value Ir_max and the minimum value Ir_min among the pixel values in the road surface area other than the white line are calculated. As a result, it becomes possible to estimate the density over the areas of the road surface other than the white line. Ir_max and Ir_min are calculated by using an approximated curve (density histogram) representing the density distribution at a road surface with uniform density which is obtained in advance. The approximated curve is determined as shown in FIG. 7 with the index point A indicating the pixel value and number of pixels corresponding to the highest frequency in the density histogram. The approximated curve used in this process may be, for instance, a quadratic curve. The apex of the quadratic curve is matched with the index point A as shown in FIG. 7. The relationship between the pixel value I and the number of pixels N in the quadratic curve is as expressed below in expression (3).

$$N = -\beta(I - Ip)^2 + Np \quad (3)$$

with β: a positive coefficient indicating the extent to which the quadratic curve widens
Ip: the pixel value corresponding to the largest number of pixels (highest frequency)

Np: the frequency value corresponding to the largest number of pixels

The coordinates of the index point A can be expressed as (Ip, Np) by using Ip and Np.

The maximum value Ir_max and the minimum value Ir_min among the pixel values over the areas of the road surface other than the white line can be ascertained as intersecting points of the quadratic curve mentioned above and the horizontal axis representing the pixel value. The maximum value Ir_max is calculated through the formula in expression (4) and the minimum value Ir_min is calculated through the formula in expression (5) below.

$$Ir\_max = Ip + \sqrt{(NP/\beta)} \quad (4)$$

$$Ir\_min = Ip - \sqrt{(NP/\beta)} \quad (5)$$

In the following step S7, it is judged as to whether or not a white line is present inside the white line detection area set in step S1. It is judged that no white line is present if the number of pixels present inside the approximated curve representing the density distribution of the road surface with a uniform density achieves a rate higher than a predetermined rate relative to the entire number of pixels in the histogram shown in FIG. 6. If, on the other hand, the number of pixels present inside the approximated curve represents a rate equal to or lower than the predetermined rate relative to the entire number of pixels in the histogram in FIG. 6, it is decided that a white line is present in the white line detection area. The number of pixels present on the inside of the approximated curve depends upon the value of the coefficient $\beta$ in expression (3). While the coefficient $\beta$ and the predetermined rate mentioned above vary in correspondence to the size of the area set for the white line detection, $\beta$ is set to 2.5 and the predetermined rate is set to 0.85 in the embodiment by assuming that the white line detection area is approximately 3 times as large as the area of the white line.

If it is judged that a white line is present in step S7, the operation proceeds to step S8. In step S8, a density conversion formula to be used to emphasize the white line area is calculated. If, on the other hand, it is judged in step S7 that no white line is present, the operation proceeds to step S9. In step S9, a density conversion formula which allows the flattened image to be directly output is calculated. The following is an explanation of the method for calculating the density conversion formula adopted when it is judged that a white line is present in the white line detection area.

Figure 8:
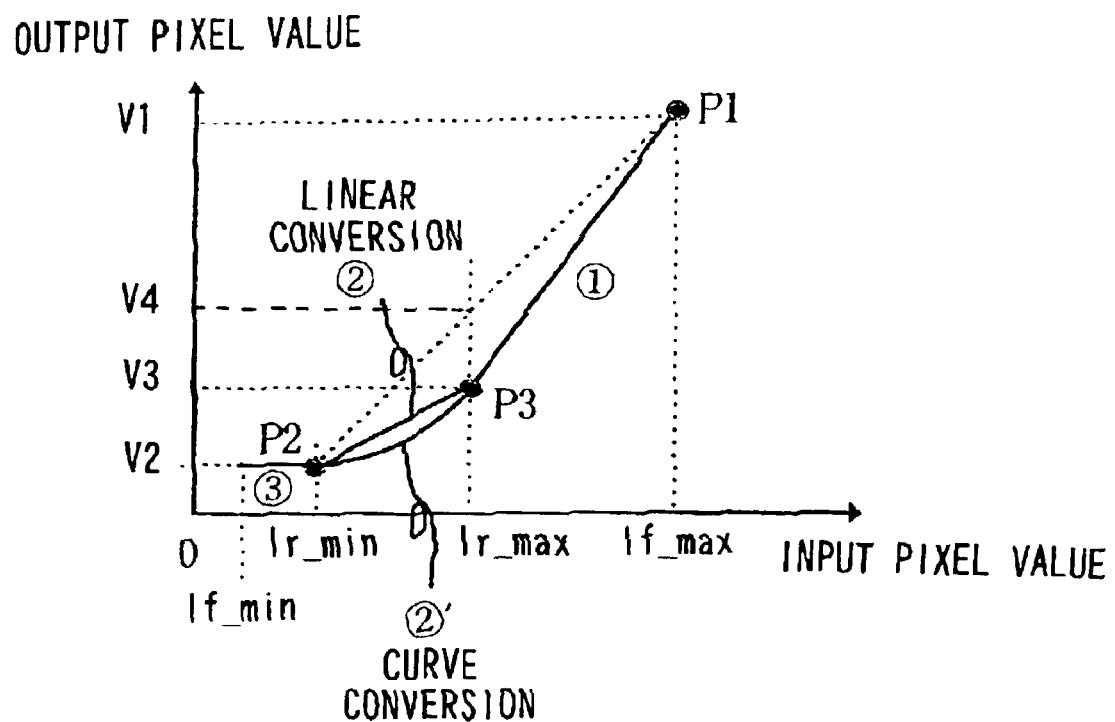
FIG. 8 illustrates the method adopted to calculate the density conversion formulae used when there is a white line present on the road surface.

V1 and V2 respectively represent the output values (converted density values) obtained by inputting the maximum pixel value If_max and the minimum pixel value If_min in the image whose density gradient has been flattened in step S4. FIG. 8 shows the relationship between an input pixel value and the corresponding output pixel value. V1 represents the pixel value with the largest output whereas V2 represents the pixel value with the smallest output. The values V1 and V2 are determined in conformance to the requirements imposed in the white line detection processing. When the contrast emphasis is to be maximized, the maximum output value V1 and the minimum output value V2 are respectively $2^n-1$ and 0 with n (bits) representing the value of a given pixel.

In FIG. 8, a point P1 indicates the output pixel value V1 obtained by inputting the maximum pixel value If_max and a point P2 indicates the output pixel value V2 obtained by inputting the minimum value Ir_min among the pixel values over the areas of the road surface other than the white line. As explained later, the output pixel value obtained by inputting Ir_min is equal to the output pixel value obtained by inputting the minimum pixel value If_min.

Next, an arbitrary point P3 representing the output value obtained by inputting the maximum value Ir_max among the pixel values over the areas of the road surface other than the white line, having been calculated in step S5, is set. V3 indicates the output pixel value corresponding to the point P3. The output pixcel value V3 is smaller than an output value V4 at the intersecting point of the straight line connecting the point P1 and the point P2 in FIG. 8 and the input pixel value I=Ir_max. If a pixel value between the maximum value Ir_max among the pixel values over the areas of the road surface other than the white line and the maximum pixel value If_max is input, the output value is calculated by using the straight line $\hat{1}$ connecting the point P1 and the point P3. As FIG. 8 indicates, the extent of the inclination of the straight line $\hat{1}$ is larger than the extent of the inclination of the straight line connecting the point P1 and the point P2. In addition, if a pixel value between the minimum pixel value If_min and the maximum value Ir_max among the pixel values over the areas of the road surface other than the white line is input, the output value is calculated by using the straight line $\hat{2}$ or the curve $\hat{2}'$ connecting the point P2 and the point P3. The inclination of the straight line $\hat{2}$ or the curve $\hat{2}'$ connecting the point P2 and the point P3 should be set equal to or smaller than the extent of the inclination of the straight line $\hat{1}$ connecting the point P1 and the point P3. Since the likelihood of a white line being present at a pixel with a value between the minimum value Ir_min among the pixel values over the areas of the road surface other than the white line and the minimum pixel value If_min is extremely low, the corresponding output value is assumed to be V2 ($\hat{3}$ in FIG. 8) representing the minimum pixel value.

The density conversion represented by the straight line $\hat{1}$ connecting the point P1 and the point P3 is expressed as in the formula (6) below.

$$V = k1 \cdot (I - Ir\_max) + V3 \quad (6)$$

with V: the output pixel value
I: the input pixel value
k1: the inclination of the straight line=(V1−V3)/(If_max−Ir_max)

The density conversion represented by the straight line $\hat{2}$ connecting the point P2 and the point P3 is expressed in the formula (7) below.

$$V = k2 \cdot (I - Ir\_min) + V2 \quad (7)$$

with k2: the inclination of the straight line=(V3−V2)/(Ir_max−Ir_min)

As described above, the output value V3 at the point P3 can be set to any value as long as it is smaller than V4 in FIG. 8. However, since the density values over the areas of the road surface other than the white line are merely estimated values, there is the possibility that some pixel values representing the white line are present among the pixel values equal to or smaller than the maximum pixel value Ir_max over the areas of the road surface other than the white line. Since it becomes more difficult to detect the white line if the inclination of the straight line $\hat{2}$ is reduced to an excessive degree in such a case, the value of V3 must be set by ensuring that the inclination of the straight line $\hat{2}$ is not reduced too much. The value of V3 may be, for instance, (V4)/2.

When converting the pixel values between the maximum value Ir_max and the minimum value Ir_min among the pixel values over the areas of the road surface other than the white line by using the curve $\hat{2}'$ passing through the point P2 and the point P3, the inclination of the curve $\hat{2}'$ should be set closer to the inclination of the straight line $\hat{1}$ in the vicinity of the point P3 with the inclination reduced closer to the point P2, since the likelihood of the curve containing pixel values constituting the white line becomes higher in the vicinity of the point P3 and becomes lower as the curve $\hat{2}'$ nears the point P2. Thus, the curve $\hat{2}'$, which assumes a shape with the apex oriented downward, is expressed as the following expression (8).

$$V=\gamma \cdot (I-Ir\_min)^2 + V2 \quad (8)$$

with $\gamma$: the coefficient of curvature $=(V3-V2)/(Ir\_max-Ir\_min)^2$

As explained above, the inclination of the curve $\hat{2}'$ represented by the formula in expression (8) at the point P3, which must be set equal to or smaller than the inclination of the straight line $\hat{1}$ connecting the point P1 and the point P3, must satisfy the relationship expressed in (9) below.

$$2\gamma(Ir\_max-Ir\_min) \leq k1 \quad (9)$$

In the embodiment, V3 is calculated on the assumption that the = sign connects the left side and the right side of expression (9). Namely, V3 can be expressed as in (10) below based upon expressions (8) and (9) and the value of k1 used in expression (6).

$$V3=\{V1\cdot(Ir\_max-Ir\_min)+2\cdot(If\_max-Ir\_max)\cdot V2\}/\{2\cdot(If\_max-Ir\_max)+(Ir\_max-Ir\_min) \quad (10)$$

The density conversion formulae used when it is judged that a white line is present (when the operation proceeds to step S8) are summarized below. If the input pixel value is between Ir_max and If_max, the density conversion is implemented by using expression (6) (straight line $\hat{1}$). If the input pixel value is between Ir_min and Ir_max, the density conversion is executed by using either expression (7) (straight line $\hat{2}$) or expression (8) (curve $\hat{2}'$). If the input pixel value is between If_min and Ir_min, the output pixel value is equal to the minimum pixel value V2 (straight line $\hat{3}$). As FIG. 8 shows, the white line in the image having undergone the density conversion can be emphasized by reducing the output values corresponding to the input pixel values over the areas of the road surface other than the white line that are equal to or smaller than Ir_max and thus heightening the contrast of the white line over which the input pixel values are large.

If, on the other hand, it is judged that no white line is present, i.e., if the operation proceeds to step S9 in the flowchart in FIG. 4, a conversion formula that will provide an output value equal to the input value is used. In other words, with I representing the input pixel value and V representing the output pixel value, the density conversion formula expressed as in (11) below is used.

$$V=I \quad (11)$$

Once the density conversion formula is calculated in step S8 or S9, the operation proceeds to step S10. In step S10, density conversion processing is performed on the image over the white line detection area by using the density conversion formula calculated in step S8 or S9. In the following step S11, the white line is detected based upon the image having undergone the density conversion processing before the control ends. Since the present invention is characterized by the processing implemented to emphasize the contrast of the white line in the image captured by the camera 1, a detailed explanation of the white line detection processing executed in step S11 is omitted.

In the processing executed by the white line detection apparatus according to the present invention, after the white line detection area is set in the image captured by the camera 1 and the image is smoothed (steps S1 and S2), the density gradient of the image is flattened (steps S3 and S4). Then, the density histogram is prepared by using the image with the flattened density gradient (step S5) and the maximum value Ir_max and the minimum value Ir_min among the pixel values over the areas of the road surface other than the white line are calculated (step S6) so as to enable estimation of the road surface density over areas other than the white line. Subsequently, it is judged as to whether or not a white line is present (step S7), and if it is judged that no white line is present, a conversion formula which will provide an output value equal to the input value is calculated (step S9). If, on the other hand, it is judged that a white line is present, a density conversion formula for emphasizing the white line in the image of the road surface is calculated and the density conversion is executed by using the formula before detecting the white line (steps S8, S10 and S11).

By utilizing the white line detection apparatus in the embodiment, which executes the density conversion after flattening the density gradient of the image, the reliability with which the areas of the road surface other than the white line are identified is improved and thus the white line can be detected with a high degree of reliability even when there is inconsistency in the road surface density. Since the output values over the identified road surface areas other than the white line are reduced and the output values over the areas where the white line is likely to be present are increased through the density conversion, the S/N ratio in the white line area is improved so as to enable reliable detection even when the white line has become faded. In this case, since it is ensured that the S/N ratio over the white line area is never lower than the S/N ratio of any area of the road surface other than the white line that may be lighter than the white line in reality, the white line can be reliably detected. As a result, the robustness of the white line detection processing can be increased since the detection processing is not readily affected by the density over the areas of the road surface other than the white line.

In addition, as the density correction coefficient is calculated based upon the individual pixel values and the average of all the pixel values of the image obtained by smoothing the image undergoing the white line detection processing and the density gradient is corrected by using the density correction coefficient thus calculated, the density gradient is corrected over a large range within the image processing area to improve the accuracy with which the road surface areas other than the white line are identified. Thus, the accuracy with which the white line is detected, too, is improved. Furthermore, since the density conversion processing is executed only when it is judged that a white line is present, an erroneous detection of a nonexistent white line does not occur, which is attributable to an emphasized contrast of the road surface which may result from the density conversion executed when there is no white line.

The above described embodiment is an example, and various modifications can be made without departing from the spirit and scope of the invention. The present invention is characterized in that the maximum value among the pixel values constituting the image of the road surface area other than the white line is estimated based upon the pixel values constituting the image of the white line detection processing area set within a captured road image and in that a white line is detected based upon the image having undergone the image processing through which the contrast of the image constituted of pixels with values equal to or smaller than the maximum value is lowered. Accordingly, the present invention is not restricted by the particulars of the method explained in reference to the embodiment and may be adopted in any image processing method through which the processing characterizing the present invention as described above is implemented.

The disclosure of the following priority application is herein incorporated by reference:
Japanese Patent Application No. 2001-237667 filed Aug. 6, 2001.

What is claimed is:

1. A white line detection apparatus comprising:
   an extraction device that extracts an image of a white line detection processing area set within a road image captured by an image-capturing device;
   a maximum value estimating device that estimates a maximum value among pixel values constituting the image of a road surface over the area other than a white line based upon pixel values corresponding to the image extracted by the extraction device;
   a contrast reducing device that reduces the contrast of an image corresponding to pixel values equal to or smaller than the maximum value among pixel values constituting the image of the road surface over the area other than the white line, which has been estimated by the maximum value estimating device; and
   a detection device that detects the white line based upon the image whose contrast has been lowered by the contrast reducing device.

2. A white line detection apparatus according to claim 1, further comprising:
   a density gradient correction device that corrects a density gradient of the image over the white line detection processing area extracted by the extraction device, wherein:
   the maximum value estimating device estimates the maximum value among the pixel values constituting the image of the road surface over the area other than the white line based upon pixel values of an image with the density gradient having been corrected by the density gradient correction device.

3. A white line detection apparatus according to claim 1, further comprising:
   a white line estimating device that estimates whether or not a white line is present in the white line detection processing area extracted by the extraction device, wherein:
   the contrast reducing device reduces the contrast of an image area having pixel values equal to or smaller than the maximum value among the pixel values constituting the image of the road surface over the area other than the white line if the white line estimating device estimates that a white line is present in the white line detection processing area.

4. A white line detection apparatus according to claim 2, further comprising:
   an image smoothing device that smoothes the image of the white line detection processing area, wherein:
   the density gradient correction device corrects the density gradient by a density correction coefficient which has been calculated based upon individual pixel values and the average of all the pixel values constituting the image having been smoothed by the image smoothing device.

5. A white line detection apparatus according to claim 2, wherein:
   the maximum value estimating device estimates the maximum value among the pixel values constituting the image of the road surface over the area other than the white line based upon a density histogram obtained by using the image with the density gradient having been corrected by the density gradient correction device and a density histogram of an image of a road surface with a uniform density.

6. A white line detection apparatus according to claim 2, wherein:
   the maximum value estimating device also estimates a minimum value among the pixel values constituting the image of the road surface over the area other than the white line; and
   the contrast reducing device executes density conversion for pixel values between the maximum value among the pixel values constituting the image of the road surface areas other than the white line and the maximum value among the pixel values constituting the image with the density gradient thereof having been corrected by using a conversion formula representing a straight line connecting the point P1 and the point P3 and having a larger degree of inclination than a straight line connecting the point P1 and the point P2 and executes density conversion for pixel values between the maximum value and the minimum value among the pixel values constituting the image of the road surface over the area other than the white line by using a conversion formula representing a straight line connecting the point P2 and the point P3 or a conversion formula representing a quadratic curve connecting the point P2 and the point P3 with a downward apex, with the P1, P2 and P3 representing a first, a second and a third points in a density conversion graph with a horizontal axis and a vertical axis respectively representing the input pixel value and the output pixel value as set out below: P1 indicating a point at which a maximum output pixel value is obtained in correspondence to a maximum value among the pixel values constituting the image with the density gradient having been corrected input as an input pixel value, P2 representing a point at which a minimum output pixel value is obtained in correspondence to the minimum value among the pixel values constituting the image of the road surface over the area other than the white line estimated by the maximum value estimating device input as the input pixel value and P3 representing a point at which an output pixel value is obtained in correspondence to the maximum value among the pixel values constituting the image of the road surface over the area other than the white line input as the input pixel value.

7. A white line detection apparatus, comprising:
   an extraction means for extracting an image of a white line detection processing area set within a road image captured by an image-capturing device;
   a maximum value estimation means for estimating a maximum value among pixel values constituting an image of a road surface over the area other than a white line based upon the pixel values corresponding to the image extracted by the extraction means;
   a contrast reduction means for reducing the contrast of an image corresponding to pixel values equal to or smaller than the maximum value among pixel values constituting the image of the road surface over the area other than the white line which has been estimated by the maximum value estimation means; and a detection means for detecting the white line based upon the image whose contrast has been lowered by the contrast reduction means.

8. A white line detection method, comprising:

extracting an image of a white line detection processing area set within a road image captured by an image-capturing device;

estimating a maximum value among pixel values constituting an image of a road surface over the area other than a white line based upon pixel values corresponding to the extracted image;

reducing the contrast of an image corresponding to pixel values equal to or lower than the maximum value among pixel values constituting the image of the road surface over the area other than the white line which has been estimated; and detecting the white line based upon the image whose contrast has been reduced.

* * * * *